(12) United States Patent
Takatsuki

(10) Patent No.: US 7,079,327 B2
(45) Date of Patent: Jul. 18, 2006

(54) LARGE ZOOM RATIO ZOOM LENS

(75) Inventor: Akiko Takatsuki, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 11/152,050

(22) Filed: Jun. 15, 2005

(65) Prior Publication Data

US 2006/0018035 A1   Jan. 26, 2006

(30) Foreign Application Priority Data

Jul. 23, 2004   (JP) ............... 2004-215516

(51) Int. Cl.
*G02B 15/14* (2006.01)
(52) U.S. Cl. .................... 359/686; 359/683
(58) Field of Classification Search ............. 359/683, 359/686
See application file for complete search history.

(56) References Cited

U.S. PATENT DOCUMENTS 6,519,095 B1 *   2/2003   Takato .................. 359/689

FOREIGN PATENT DOCUMENTS

JP   2003-107345   4/2003
JP   3486560   10/2003

* cited by examiner

*Primary Examiner*—Timothy Thompson
*Assistant Examiner*—William Choi
(74) *Attorney, Agent, or Firm*—Arnold International; Jon W. Henry; Bruce Y. Arnold

(57) ABSTRACT

A zoom lens with a large zoom ratio suitable for surveillance cameras includes, and may only include, four lens groups, in order from the object side, a first lens group of positive refractive power, a second lens group of negative refractive power, a third lens group of positive refractive power, and a fourth lens group of negative refractive power. The second and third lens groups move during zooming. Each of the first, second, and third lens groups is formed of three lens elements that comprise two lens components of particular constructions. Certain conditions are satisfied by the ratio of the focal lengths of the first lens group and the zoom lens, the ratio of focal lengths of the second and third lens groups, and the arithmetic mean of the Abbe numbers and indexes of refraction of lens elements having positive refractive power in the first lens group.

20 Claims, 7 Drawing Sheets

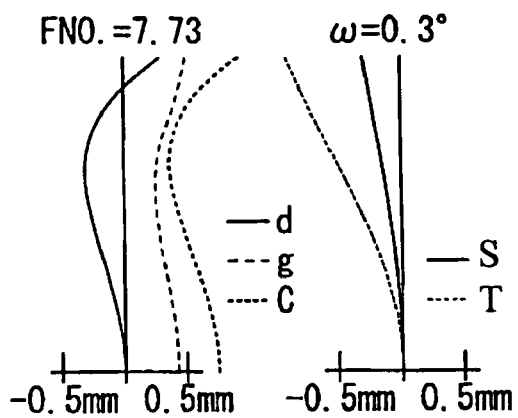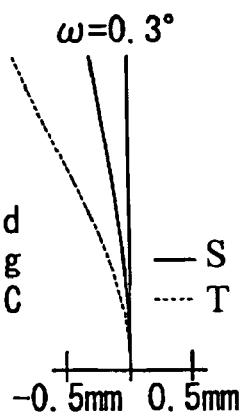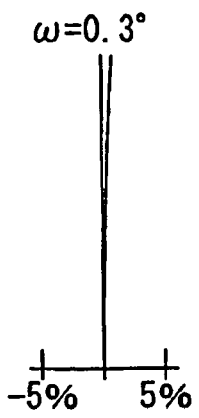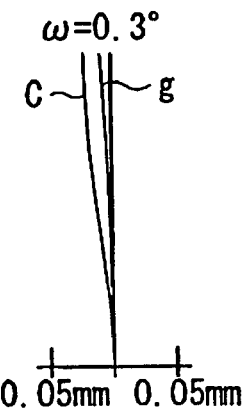
Fig. 7A  Fig. 7B  Fig. 7C  Fig. 7D
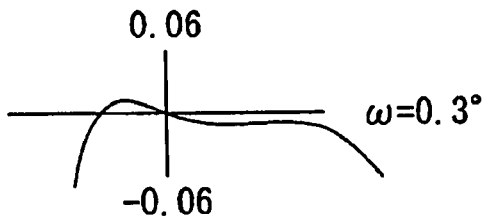
Fig. 7E
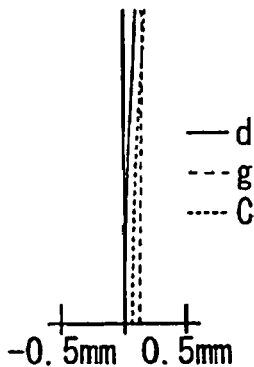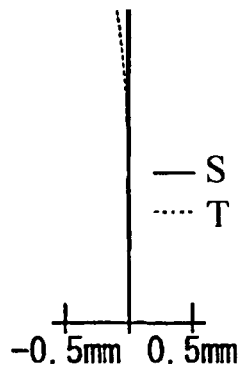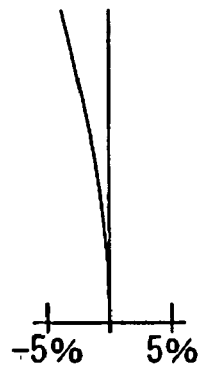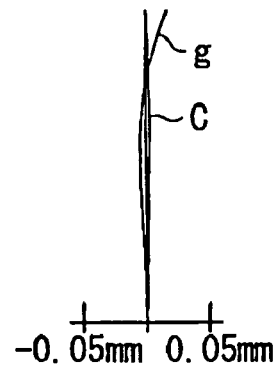
Fig. 8A  Fig. 8B  Fig. 8C  Fig. 8D
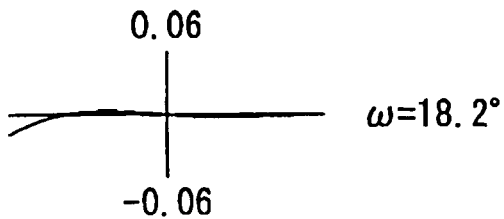
Fig. 8E

LARGE ZOOM RATIO ZOOM LENS

TECHNICAL FIELD OF THE INVENTION

The present invention relates to a zoom lens having a large zoom ratio of approximately sixty, and more specifically to a large zoom ratio zoom lens that is suitable for use in a surveillance video camera.

BACKGROUND OF THE INVENTION

In recent years, there has been an increasing demand for the development of imaging lens systems for surveillance video cameras used for monitoring from a long distance. To monitor from a long distance, zoom lenses with large zoom ratios are required. However, it is difficult for the zoom lenses to achieve favorable properties over the entire zoom range. In order to achieve these favorable properties, the sizes of the zoom lenses tend to become large.

Zoom lenses with large zoom ratios suitable for surveillance video cameras are described in Japanese Laid-Open Patent Application 2003-107345 as "zoom lens systems with very large zoom ratios" and provide zoom ratios of approximately fifty-five. Each of these lens systems includes, in order from the object side, a first lens group having positive refractive power, a second lens group having negative refractive power, a third lens group having negative refractive power, and a fourth lens group having positive refractive power. The second and third lens groups move for zooming in order to vary the focal length of the zoom lens and to compensate for movement of the image plane with the variation in focal length.

In contrast, as zoom lenses with high quality used for broadcast television cameras, zoom lenses that include, in order from the object side, lens groups having negative and positive refractive powers that move for zooming have been conventionally and widely used as zoom lenses of large size and with large zoom ratios. These zoom lenses include, in order from the object side, a first lens group that is fixed when zooming, a second lens group having negative refractive power that is movable when zooming, a third lens group having positive refractive power that is movable when zooming, and a fourth lens group that is fixed when zooming. In these types of zoom lenses, the second lens group acts primarily as the variator for varying the focal length of the zoom lens and the third lens group acts primarily as the compensator for compensating for movement of the image plane that would otherwise occur with variation in the focal length due to movement of the second lens group. However, the third lens group is capable of contributing variations in the focal length by its movement to some extent, and therefore the moving distance of the second lens group becomes relatively shorter, which results in shortening the overall length of the lens system.

An example of this type of zoom lens is described in Japanese Patent No. 3486560. As described in Japanese Patent No.3486560, this type of zoom lens includes, in order from the object side, a first lens group having positive refractive power, a second lens group having negative refractive power, a third lens group having positive refractive power, and a fourth lens group having positive refractive power; and a lens element of the third lens group includes an aspheric surface. This type of zoom lens is described as having an f-number of approximately 1.5–1.7, which is a relatively large aperture ratio, and a zoom ratio of approximately nineteen to fifty, which includes large zoom ratios.

However, the demand for a zoom lens having a larger zoom ratio of approximately sixty is expected to be required soon in the surveillance camera market. In addition, the major application of surveillance video cameras used in harbors is for monitoring from a long distance and high performance at close range is not as necessary as with applications of standard television cameras for broadcasting, and the zoom lenses of Japanese Patent No. 3486560 are described as high performance zoom lenses for use in television cameras for broadcasting. Moreover, there is a tendency to increase the size of the lens elements placed on the object side in order to provide appropriate performance at close range. Therefore, the need for the development of a comparatively compact zoom lens with a large zoom ratio suitable for mounting in surveillance video cameras is clear.

BRIEF SUMMARY OF THE INVENTION

The present invention relates to a compact zoom lens having a large zoom ratio suitable for surveillance video cameras, and particularly relates to a four-group zoom lens that includes two lens groups of negative and positive refractive power, respectively, in order from the object side, and these two lens groups move in order to perform zooming. A compact zoom lens having a large zoom ratio is achieved by properly setting the refractive powers of these two lens groups.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 7A–7E show the spherical aberration, astigmatism, distortion, lateral color, and coma, respectively, of the zoom lens according to Embodiment 1 at the telephoto end;

FIGS. 8A–8E show the spherical aberration, astigmatism, distortion, lateral color, and coma, respectively, of the zoom lens according to Embodiment 2 at the wide-angle end;

DETAILED DESCRIPTION

Figure 1A:
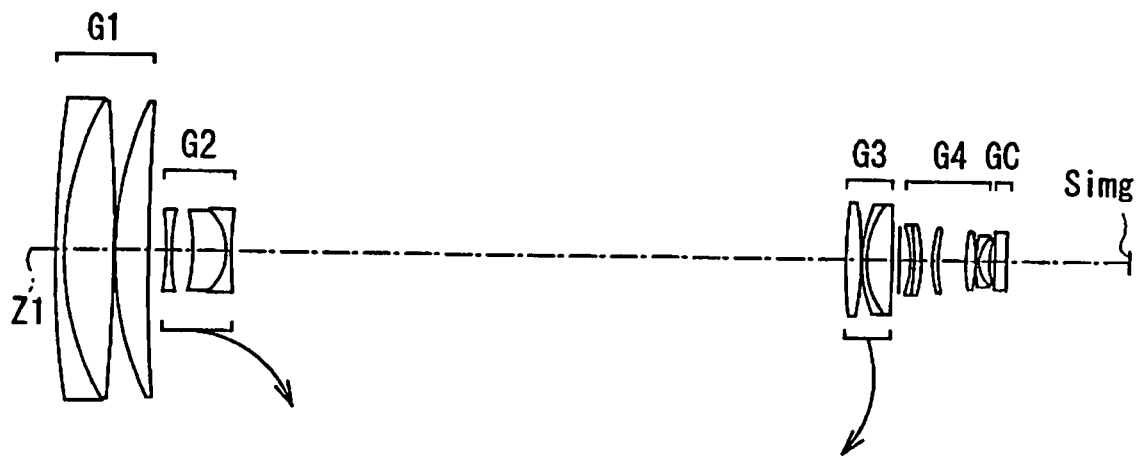
FIGS. 1A–1C show cross-sectional views of Embodiment 1 of the present invention at the wide-angle end, at an intermediate focal length setting, and at the telephoto end, respectively.

A general description of the four-group zoom lens of the present invention that pertains to the two embodiments of the invention will first be described primarily with reference to FIGS. 1A–1C and FIG. 2 that show Embodiment 1. In FIGS. 1A–1C and FIG. 2, the four lens groups are labeled G1–G4 in order from the object side of the zoom lens and the lens components that belong to each lens group are indicated by brackets just below the labels G1–G4, with matching lower brackets with arrows for lens groups G2 and G3 in FIGS. 1A and 1B that indicate the general direction of movement of these lens groups during zooming. Lens groups G1 and G4 remain stationary during zooming. In FIG. 2, the lens elements of the lens groups are referenced by the letter L followed by two digits denoting their order from the object side of the zoom lens along the optical axis Z1, from L11 to L13 in lens group G1, from L21 to L23 in lens group G2, from L31 to L33 in lens group G3, and from L41 to L46 in lens group G4. The first digit denotes the lens group and the second digit denotes the lens element order from the object side of the zoom lens.

Radii of curvature of the surfaces of various optical elements, including the lens surfaces, are referenced by the letter R followed by a number denoting their order from the object side of the zoom lens, from R1 to R28 in FIG. 2. The on-axis surface spacings along the optical axis Z1 of various optical surfaces are referenced by the letter D followed by a number denoting their order from the object side of the zoom lens, but only the on-axis surface spacings that vary, that is, the surface spacings, D5, D10, and D15, between the lens groups are shown in FIG. 2 for clarity of illustration.

The term "lens group" is defined in terms of "lens elements" and "lens components" as explained herein. The term "lens element" is herein defined as a single transparent mass of refractive material having two opposed refracting surfaces that are oriented at least generally transverse to the optical axis of the zoom lens. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or overall so close together that the spacings between adjacent lens surfaces of the different lens elements are so small that the spacings can be neglected in computing the optical image forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component." Alternatively, a lens component may frequently be made by cementing together two lens elements. The term "lens group" is herein defined as an assembly of one or more lens components in optical series and with no intervening lens components along an optical axis that during zooming is movable as a single unit relative to another lens component or other lens components.

This type of zoom lens is, for example, mounted and used on a surveillance video camera in harbors for monitoring at a long distance. The zoom lens includes, in order from the object side, a first lens group G1 having positive refractive power, a second lens group G2 having negative refractive power, a third lens group G3 having positive refractive power, and a fourth lens group G4 having negative refractive power. A Stop St is, for example, placed on the object side of the fourth lens group G4, as shown in FIGS. 1A–1C and FIG. 2.

As shown in FIGS. 1A–1C and FIG. 2, an optical element GC, such as a cover glass for protecting the image plane Simg and various optical filters, may be placed between the fourth lens group G4 and the image plane surface according to the configuration of the camera mounting the lens.

In the zoom lens of the present invention, zooming is performed by changing the focal length by changing the distance between the two lens zooming groups, G2 and G3, by moving these lens groups along the optical axis Z1. More specifically, variation of the focal length is primarily performed by moving the second lens group G2 along the optical axis and compensation for movement of the image plane due to the movement of the second lens group G2 is primarily performed by moving the third lens group G3 along the optical axis. In addition, movement of the third lens group G3 contributes to the change in focal length. The second lens group G2 and the third lens group G3 move as shown by the downwardly directed arrows of FIGS. 1A and 1B when zooming from the wide-angle end to the telephoto end. The first lens group G1 and the fourth lens group G4 are fixed when zooming.

The zoom lens of the present invention satisfies the following Conditions (1) and (2):

$$0.24 < f1/ft < 0.29 \qquad \text{Condition (1)}$$

$$-0.55 < f2/f3 < -0.44 \qquad \text{Condition (2)}$$

where f1 is the focal length of the first lens group G1;

ft is the focal length of the entire zoom lens at the telephoto end;

f2 is the focal length of the second lens group G2; and f3 is the focal length of the third lens group G3.

It is preferable that the lower limit of Condition (1) above be satisfied in order to prevent the refractive power of the first lens group G1 from becoming too strong, which, in turn, would cause the spherical aberration, which is of negative sign, to become too large in absolute value at the telephoto end. Additionally, it is preferable to satisfy the upper limit of Condition (1) above in order to make it easier for the zoom lens to be made compact.

It is preferable to satisfy the upper limit of Condition (2) above in order to prevent the coma aberration from becoming too large. It is preferable to satisfy the lower limit of Condition (2) above in order to make it easier for the zoom lens to be made compact.

The first lens group G1 includes at least three lenses, lens elements L11, L12, and L13 as shown in FIG. 2. Lens elements L11, L12, and L13 preferably have negative, positive, and positive refractive powers, respectively. Preferably, the first lens group G1 is constructed so that the following Conditions (3) and (4) are satisfied:

$$N1 < 1.52 \qquad \text{Condition (3)}$$

$$80 < v1 \qquad \text{Condition (4)}$$

where

N1 is the arithmetic average of the indexes of refraction of the two lens elements (L12 and L13) having positive refractive power in the first lens group G1; and $v1$ is the arithmetic average of the Abbe numbers of the two lens elements (L12 and L13) having positive refractive power in the first lens group G1.

Conditions (3) and (4) above are conditions for determining the lens materials of the lens elements having positive refractive power of the first lens group G1 in order to favorably correct chromatic aberration. When Conditions (3) and (4) are not satisfied, it becomes difficult to sufficiently correct axial chromatic aberration, especially at the telephoto end.

As shown in FIG. 2, lens elements L11 and L12, for example, may form a cemented lens component. Lens element L11, may be, for example, a meniscus lens element having negative refractive power with its convex surface on the object side. Lens element L12, may be, for example, a biconvex lens element; and lens element L13 may be, for example, a meniscus lens element having positive refractive power with its convex surface on the object side.

The second lens group G2 includes at least three lens elements, lens elements L21, L22, and L23 as shown in FIG. 2. As shown in FIG. 2, lens element L21 has negative refractive power, and lens elements L22 and L23 preferably have positive and negative refractive powers, respectively, and are cemented together to form a lens component. Lens element L21 may be, for example, a biconcave lens element. Lens element L22 may be, for example, a meniscus lens element having positive refractive power with its convex surface on the image side. Lens element L23 may be, for example, a biconcave lens.

As shown in FIG. 2, the third lens group G3 includes at least three lens components, namely, lens elements, L31, L32, and L33, respectively. Lens element L31 has positive refractive power, and lens elements L32 and L33 preferably have negative and positive refractive power, respectively, and are cemented together to form a single lens component. Lens element L31 may be, for example, a biconvex lens element. Lens element L32 may be, for example, a meniscus lens element having negative refractive power with its convex surface on the object side. Lens element L33 has a convex surface on the object side. When lens elements L32 and L33 form a cemented lens component and have negative and positive refractive power, respectively, in order from the object side, the Abbe number of the lens element having positive refractive power, (i.e., of lens element L33) is preferably greater than 80.

The fourth lens group G4 may be formed, for example, of six lens elements, such as lens elements L41–L46, as shown in FIG. 2. Also, in the exemplary Embodiment 1 shown in FIG. 2, lens elements L41 and L42 form a cemented lens component, as do the lens elements L45 and L46.

In addition, the characteristics of the zoom lens according to the present invention relate more specifically to the construction of the first lens group G1, the second lens group G2, and the third lens group G3 than to the construction of the fourth lens group G4, and therefore the construction of the fourth lens group G4 may be greatly varied from the specific construction described above and below and in the various figures, including variations in the number and shapes of the lens elements and lens components of the fourth lens group G4.

In the zoom lens of the present invention, various aberrations are favorably corrected over the entire zooming range by using a second lens group G2 that includes, in order from the object side, at least one lens element having negative refractive power and a lens component formed of a lens element having positive refractive power cemented to a lens element having negative refractive power, and also by using a third lens group G3 that includes, in order from the object side, at least one lens element having positive refractive power and a lens component formed of a lens element having negative refractive power cemented to a lens element having positive refractive power. More specifically, the coma aberration at the intermediate setting of the focal length is favorably corrected. Furthermore, axial chromatic aberration at this intermediate setting is favorably corrected by the lens element having positive refractive power of the cemented lens component of the third lens group G3 having an Abbe number larger than 80.

As described above, according to the zoom lens of the present invention, a compact zoom lens with a large zoom ratio especially suitable for a surveillance video camera is realized by determining the specifics of the four lens groups of the zoom lens in order to achieve the large zoom ratio with the zooming lens groups, namely, the second lens group and the third lens group, having negative refractive power and positive refractive power, respectively, and by designing the zoom lens to satisfy Conditions (1) and (2) above. In addition, aberration performance is further improved by appropriately adopting and satisfying Conditions (3) and (4).

Preferred embodiments of the present invention may include only the four lens groups described above in order to define a four-group zoom lens. Two embodiments of the present invention, which do in fact include only four lens groups, will now be described with reference to the drawings.

EMBODIMENT 1

Figure 1B:
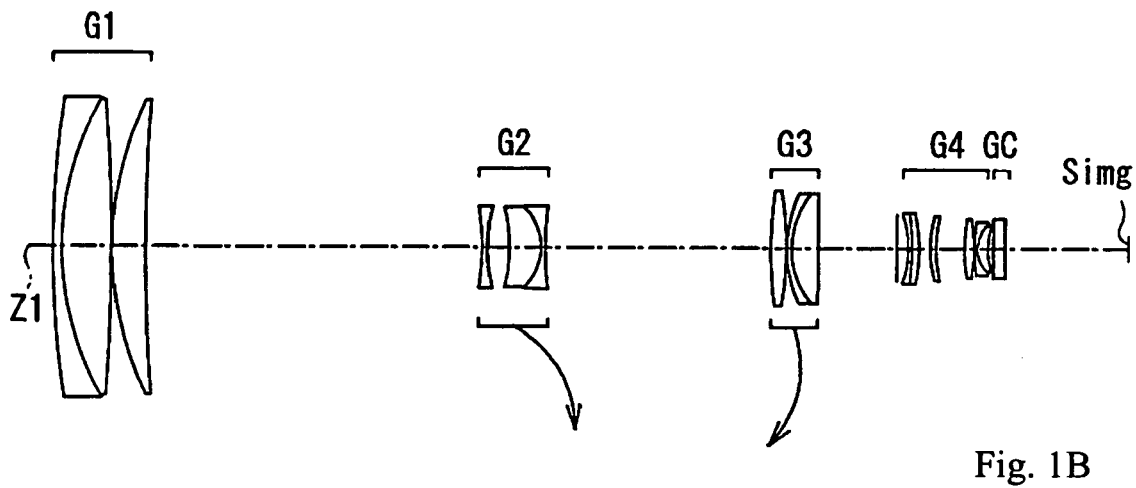
Figure 1C:
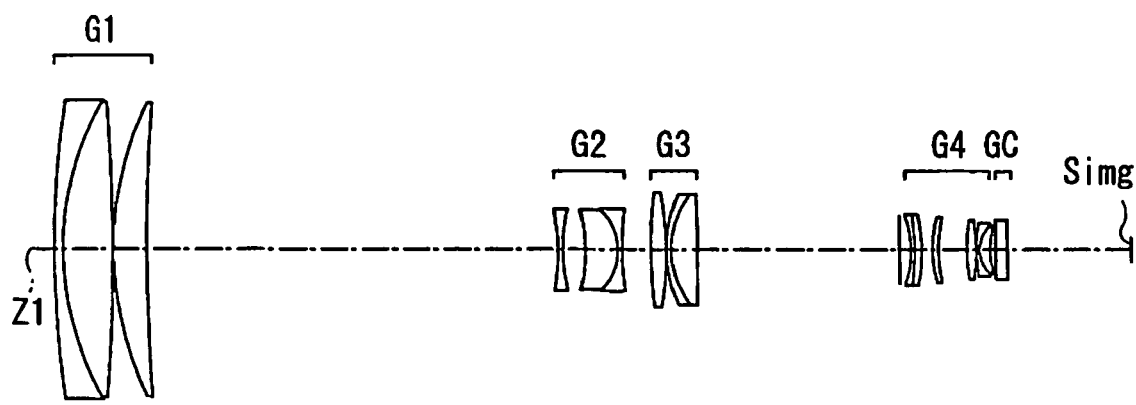
Figure 2:
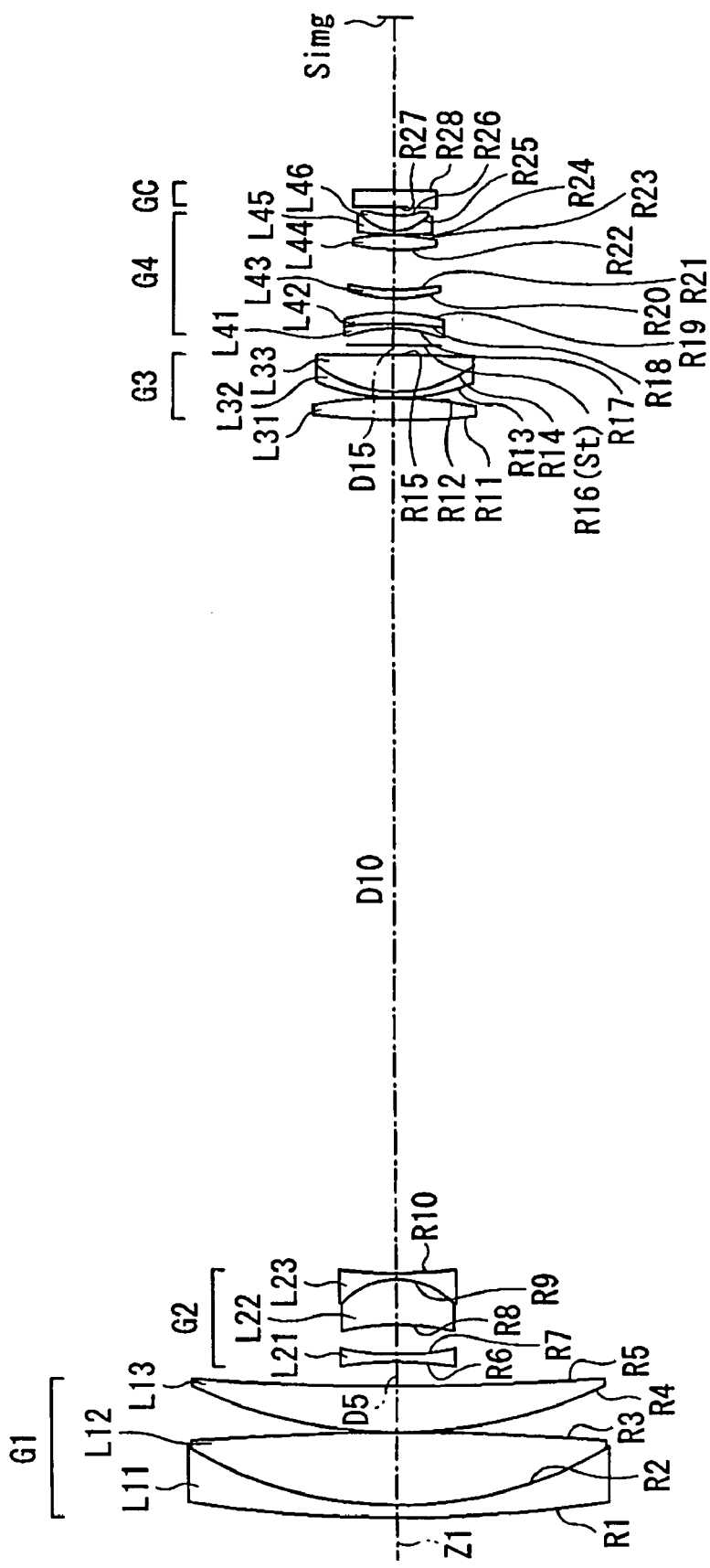
FIG. 2 shows an enlarged detailed cross-sectional view of Embodiment 1 of the zoom lens of the present invention at the wide-angle end.

FIGS. 1A–1C show cross-sectional views of Embodiment 1 of the present invention at the wide-angle end, at an intermediate focal length setting, and at the telephoto end, respectively, and FIG. 2 shows an enlarged detailed cross-sectional view of Embodiment 1 of the zoom lens of the present invention at the wide-angle end. Table 1 below lists the surface number #, in order from the object side, the radius of curvature R (in mm) of each surface, the on-axis surface spacing D (in mm), as well as the refractive index $N_d$ and the Abbe number $v_d$ (both at the d-line of 587.6 nm) of each optical element, including optical element GC, for Embodiment 1.

TABLE 1

| # | R | D | $N_d$ | $v_d$ |
|---|---|---|---|---|
| 1 | 336.007 | 3.00 | 1.58144 | 40.7 |
| 2 | 97.913 | 17.39 | 1.49700 | 81.5 |
| 3 | −627.188 | 0.10 | | |
| 4 | 114.694 | 11.18 | 1.49700 | 81.5 |
| 5 | 742.008 | D5 (variable) | | |
| 6 | −82.527 | 1.74 | 1.83400 | 37.1 |
| 7 | 63.127 | 7.31 | | |
| 8 | −55.640 | 10.88 | 1.84660 | 23.9 |
| 9 | −18.609 | 1.50 | 1.74399 | 44.8 |
| 10 | 125.082 | D10 (variable) | | |
| 11 | 163.213 | 5.23 | 1.75500 | 52.3 |
| 12 | −105.762 | 0.10 | | |
| 13 | 47.955 | 1.50 | 1.84660 | 23.9 |
| 14 | 31.090 | 8.83 | 1.49700 | 81.5 |
| 15 | −783.299 | D15 (variable) | | |
| 16 | ∞ (stop) | 4.00 | | |
| 17 | −32.866 | 1.20 | 1.67270 | 32.1 |
| 18 | −91.570 | 2.55 | 1.84660 | 23.9 |
| 19 | −48.902 | 3.55 | | |
| 20 | 37.379 | 2.00 | 1.83480 | 42.7 |
| 21 | 51.526 | 9.53 | | |
| 22 | 53.021 | 3.45 | 1.49700 | 81.5 |
| 23 | −49.970 | 0.10 | | |

TABLE 1-continued

| # | R | D | $N_d$ | $v_d$ |
|---|---|---|---|---|
| 24 | 57.335 | 1.00 | 1.83480 | 42.7 |
| 25 | 10.626 | 3.53 | 1.62004 | 36.2 |
| 26 | 19.815 | 2.00 | | |
| 27 | ∞ | 4.00 | 1.51633 | 64.0 |
| 28 | ∞ | 41.64 | | |

In the zoom lens of Embodiment 1, the second lens group G2 and the third lens group G3 move during zooming. Therefore, the values of the on-axis spacings D5, D10, and D15 between the lens groups change with zooming. Table 2 below lists the values of the variables D5, D10, and D15 (i.e, the group spacings) and the f-number $F_{NO}$ at the wide-angle end (f=12.81 mm), at an intermediate focal length (f=128.08 mm), and at the telephoto end (f=762.07 mm) for Embodiment 1.

TABLE 2

| f | D5 | D10 | D15 | $F_{NO}$ |
|---|---|---|---|---|
| 12.81 | 5.97 | 205.76 | 2.32 | 3.84 |
| 128.08 | 112.50 | 75.21 | 26.33 | 3.90 |
| 762.07 | 137.50 | 9.68 | 66.87 | 7.73 |

As is apparent from Table 2, the zoom ratio of Embodiment 1 is approximately sixty, which is a large zoom ratio.

The zoom lens of Embodiment 1 of the present invention satisfies Conditions (1)–(4) above as set forth in Table 3 below.

TABLE 3

| Condition No. | Condition | Value |
|---|---|---|
| (1) | 0.24 < f1/ft < 0.29 | 0.25 |
| (2) | −0.55 < f2/f3 < −0.44 | −0.45 |
| (3) | N1 < 1.52 | 1.49700 |
| (4) | 80 < v1 | 81.5 |

Figures 5A, 5B, 5C, 5D:
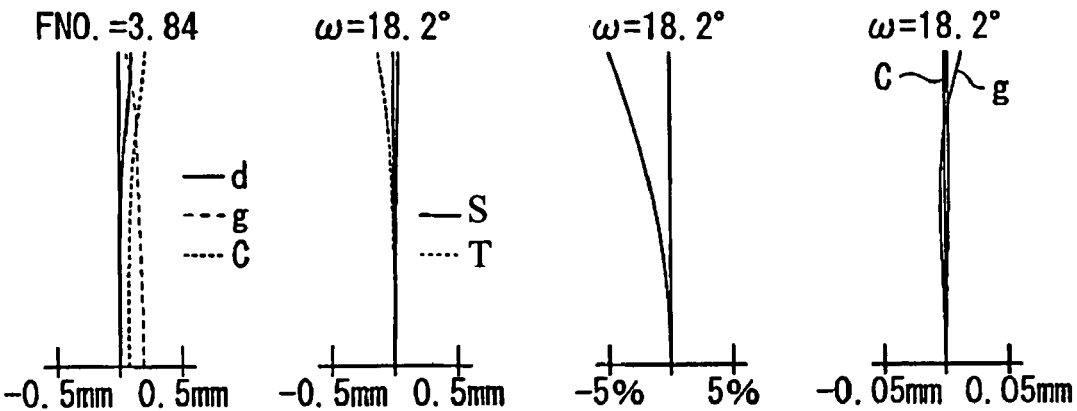
FIGS. 5A–5E show the spherical aberration, astigmatism, distortion, lateral color, and coma, respectively, of the zoom lens according to Embodiment 1 at the wide-angle end.
Figure 5E:
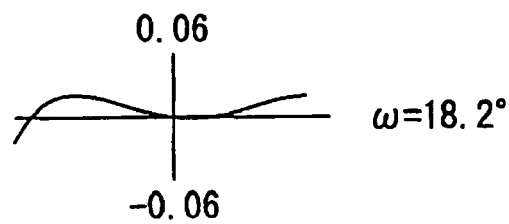
Figures 6A, 6B, 6C, 6D:
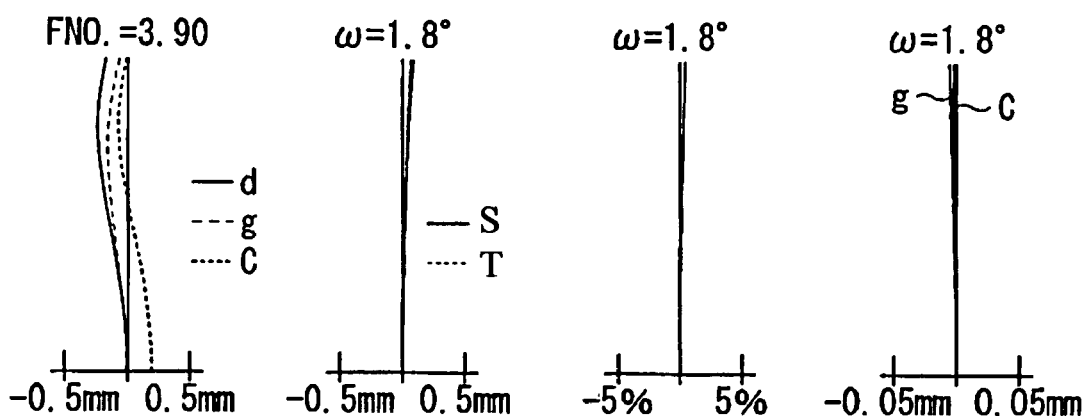
FIGS. 6A–6E show the spherical aberration, astigmatism, distortion, lateral color, and coma, respectively, of the zoom lens according to Embodiment 1 at an intermediate focal length setting.
Figure 6E:
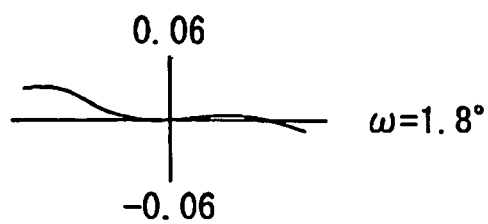

FIGS. 5A–5E show the spherical aberration, astigmatism, distortion, lateral color, and coma, respectively, of the zoom lens of Embodiment 1 at the wide-angle end. FIGS. 6A–6E show the spherical aberration, astigmatism, distortion, lateral color, and coma, respectively, of the zoom lens of Embodiment 1 at an intermediate focal length setting; and FIGS. 7A–7E show the spherical aberration, astigmatism, distortion, lateral color, and coma, respectively, of the zoom lens of Embodiment 1 at the telephoto end. In FIGS. 5A, 6A, and 7A, the spherical aberration (in mm) is shown for the wavelengths 587.6 nm (the d-line), 435.8 nm (the g-line), and 656.3 nm (the C-line), and the f-number is shown. In the remaining figures, ω is the half-field angle. In FIGS. 5B, 6B, and 7B, the astigmatism (in mm) is shown for the sagittal image surface S and the tangential image surface T and is measured at 587.6 nm (the d-line). In FIGS. 5C, 6C, and 7C, distortion (in per cent) is measured at 587.6 nm (the d-line). In FIGS. 5D, 6D, and 7D, the lateral color (in mm) is shown for the wavelengths 435.8 nm (the g-line) and 656.3 nm (the C-line) relative to 587.6 nm (the d-line). In FIGS. 5E, 6E, and 7E, coma (in mm) is measured at 587.6 nm (the d-line).

EMBODIMENT 2

Figure 3A:
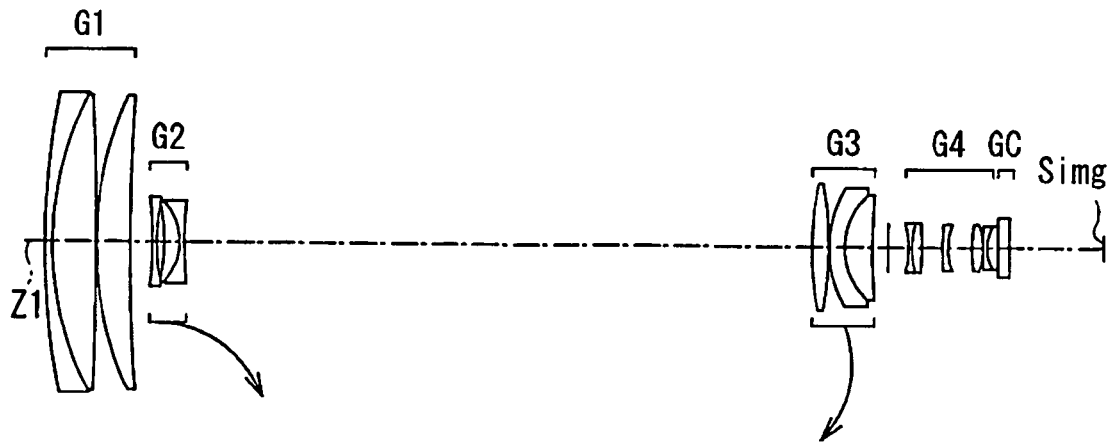
FIGS. 3A–3C show cross-sectional views of Embodiment 2 of the present invention at the wide-angle end, at an intermediate focal length setting, and at the telephoto end, respectively.
Figure 3B:
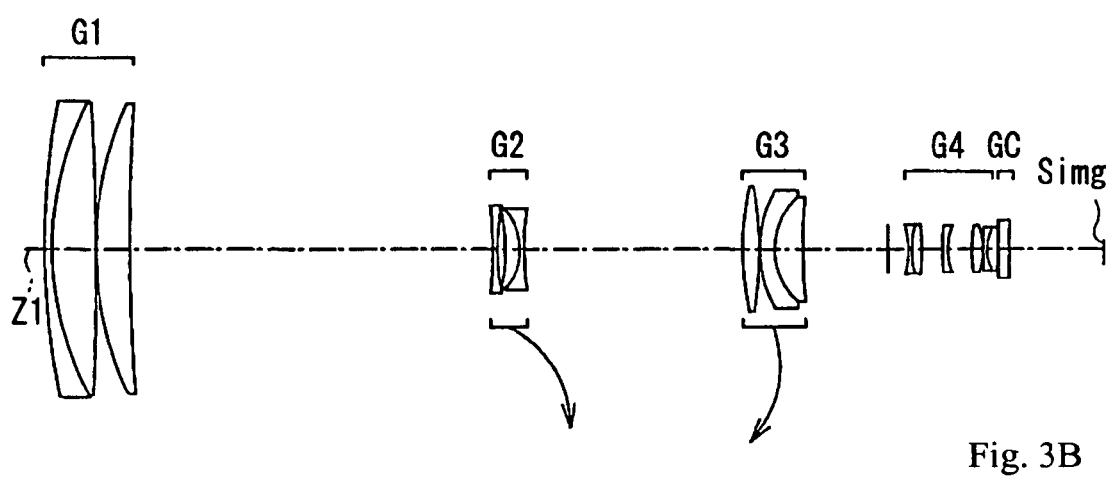
Figure 3C:
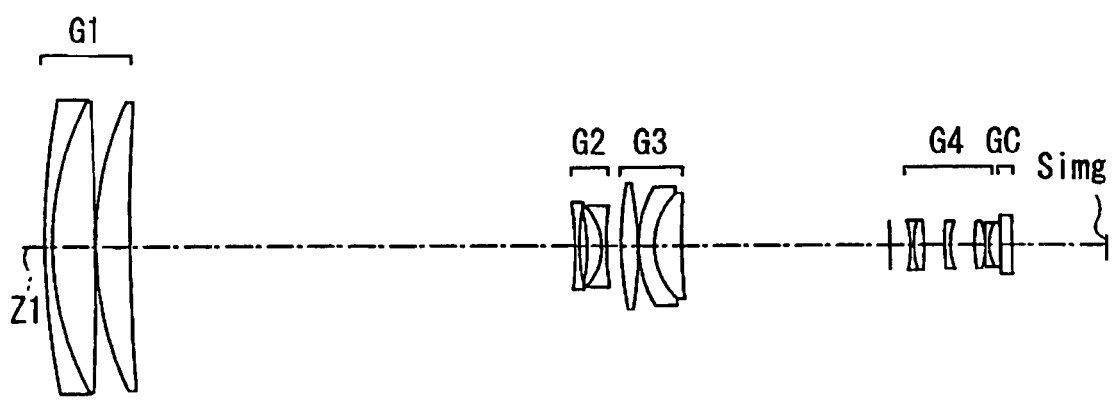
Figure 4:
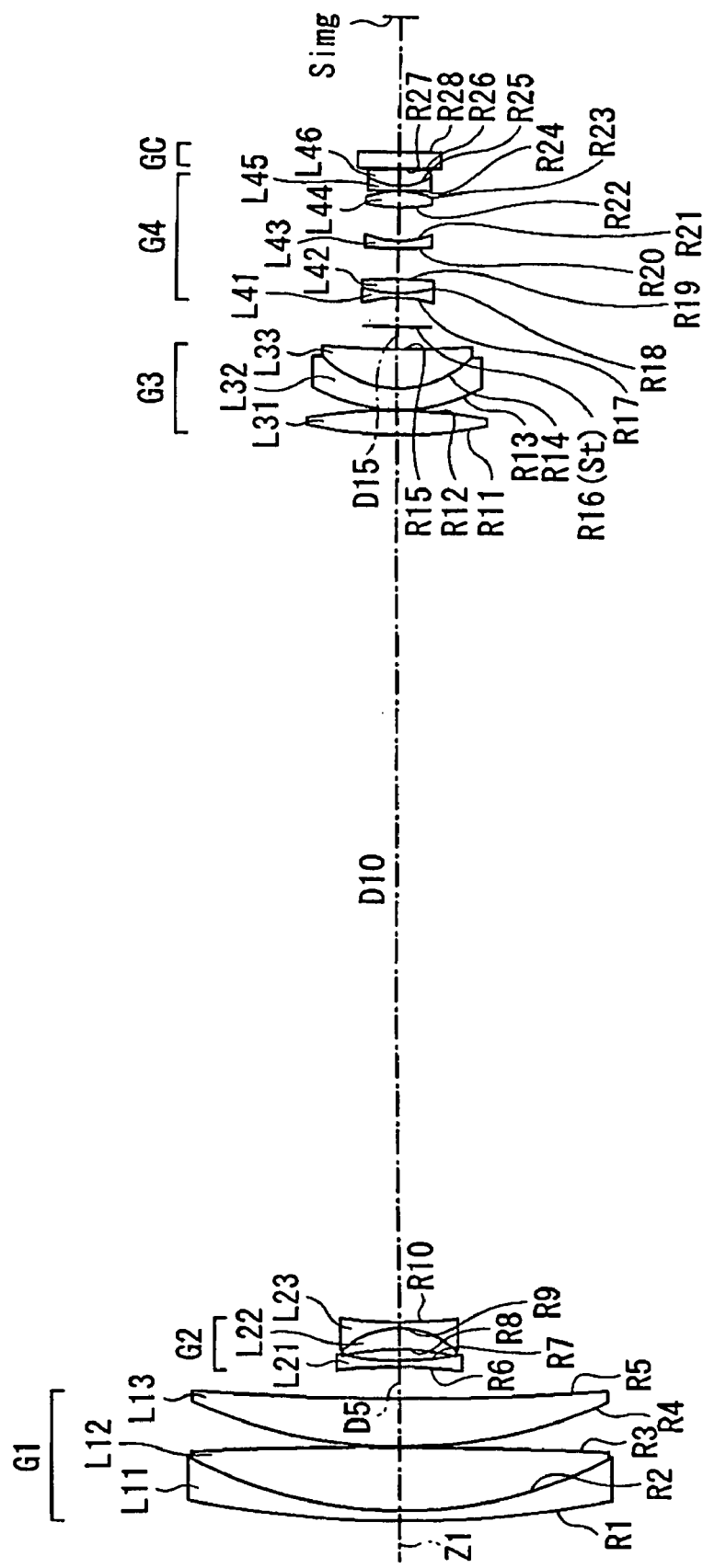
FIG. 4 shows an enlarged detailed cross-sectional view of Embodiment 2 of the zoom lens of the present invention at the wide-angle end.

FIGS. 3A–3C show cross-sectional views of Embodiment 2 of the present invention at the wide-angle end, at an intermediate focal length setting, and at the telephoto end, respectively, and FIG. 4 shows an enlarged detailed cross-sectional view of Embodiment 2 of the zoom lens of the present invention at the wide-angle end. Embodiment 2 is very similar to Embodiment 1 and therefore only the differences between Embodiment 2 and Embodiment 1 will be explained. Embodiment 2 differs from Embodiment 1 in its lens element configuration by having different radii of curvature of the lens surfaces, some different optical element surface spacings, and some different refractive indexes and Abbe numbers of the materials of the lens elements.

Table 4 below lists the surface number #, in order from the object side, the radius of curvature R (in mm) of each surface, the on-axis surface spacing D (in mm), as well as the refractive index $N_d$ and the Abbe number $v_d$ (both at the d-line of 587.6 nm) of each optical element, including optical element GC, for Embodiment 2.

TABLE 4

| # | R | D | $N_d$ | $v_d$ |
|---|---|---|---|---|
| 1 | 265.969 | 2.50 | 1.59551 | 39.2 |
| 2 | 105.610 | 15.18 | 1.49700 | 81.5 |
| 3 | −1129.443 | 0.10 | | |
| 4 | 119.915 | 11.54 | 1.43875 | 94.9 |
| 5 | 726.523 | D5 (variable) | | |
| 6 | −134.638 | 1.50 | 1.74949 | 35.3 |
| 7 | 67.030 | 2.77 | | |
| 8 | −55.539 | 5.02 | 1.84665 | 23.8 |
| 9 | −20.155 | 1.50 | 1.75500 | 52.3 |
| 10 | 104.632 | D10 (variable) | | |
| 11 | 104.584 | 5.90 | 1.75500 | 52.3 |
| 12 | −119.291 | 0.10 | | |
| 13 | 40.853 | 5.24 | 1.84665 | 23.8 |
| 14 | 24.970 | 9.36 | 1.49700 | 81.5 |
| 15 | 203.202 | D15 (variable) | | |
| 16 | ∞ (stop) | 6.91 | | |
| 17 | −30.426 | 1.20 | 1.59551 | 39.2 |
| 18 | 29.397 | 3.43 | 1.83400 | 37.1 |
| 19 | −90.158 | 7.39 | | |
| 20 | 120.892 | 1.80 | 1.69679 | 55.5 |
| 21 | 22.052 | 8.00 | | |
| 22 | 45.268 | 3.81 | 1.49700 | 81.5 |
| 23 | −24.182 | 0.10 | | |
| 24 | −742.863 | 1.20 | 1.80400 | 46.6 |
| 25 | 14.352 | 4.04 | 1.58144 | 40.7 |
| 26 | −88.498 | 0.00 | | |
| 27 | ∞ | 4.00 | 1.51633 | 64.0 |
| 28 | ∞ | 32.27 | | |

In the zoom lens of Embodiment 2, the second lens group G2 and the third lens group G3 move during zooming. Therefore, the values of the on-axis spacings D5, D10, and D15 between the lens groups change with zooming. Table 5 below lists the values of the variables D5, D10, and D15 (i.e, the group spacings) and the f-number $F_{NO}$ at the wide-angle end (f=12.80 mm), at an intermediate focal length (f=127.96 mm), and at the telephoto end (f=761.35 mm) for Embodiment 2.

TABLE 5

| f | D5 | D10 | D15 | $F_{NO}$ |
|---|---|---|---|---|
| 12.80 | 7.56 | 213.47 | 5.55 | 3.84 |
| 127.96 | 123.02 | 74.65 | 28.91 | 3.82 |
| 761.35 | 151.13 | 4.96 | 70.49 | 7.69 |

As is apparent from Table 5, the zoom ratio of Embodiment 2 is approximately sixty, which is a large zoom ratio.

The zoom lens of Embodiment 2 of the present invention satisfies Conditions (1)–(4) above as set forth in Table 6 below.

TABLE 6

| Condition No. | Condition | Value |
|---|---|---|
| (1) | 0.24 < f1/ft < 0.29 | 0.28 |
| (2) | −0.55 < f2/f3 < −0.44 | −0.54 |
| (3) | N1 < 1.52 | 1.46787 |
| (4) | 80 < ν1 | 88.3 |

Figures 9A, 9B, 9C, 9D:
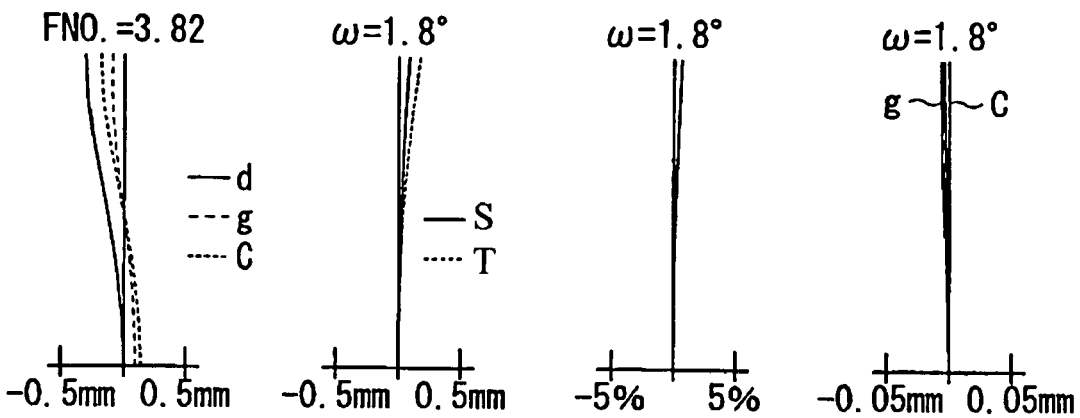
FIGS. 9A–9E show the spherical aberration, astigmatism, distortion, lateral color, and coma, respectively, of the zoom lens according to Embodiment 2 at an intermediate focal length setting.
Figure 9E:
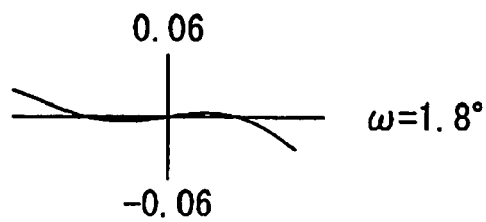
Figures 10A, 10B, 10C, 10D:
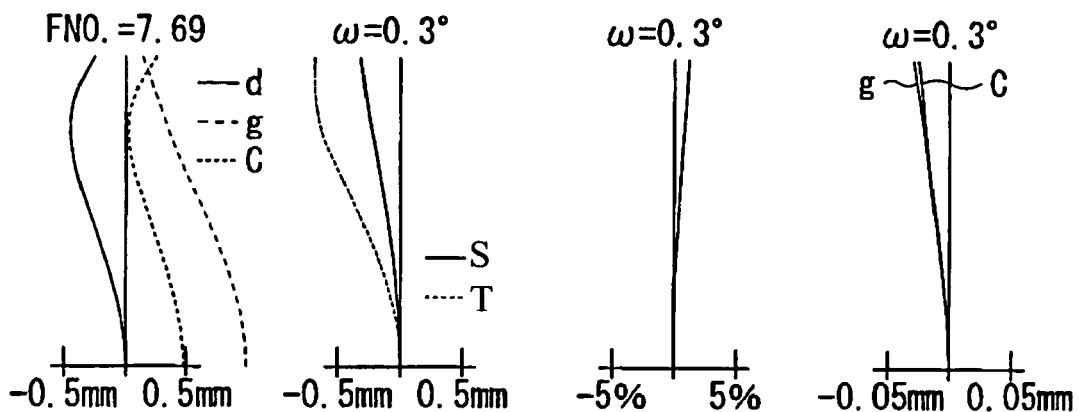
FIGS. 10A–10E show the spherical aberration, astigmatism, distortion, lateral color, and coma, respectively, of the zoom lens according to Embodiment 2 at the telephoto end.
Figure 10E:
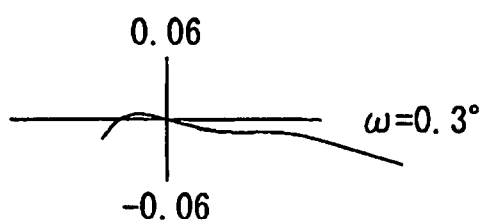

FIGS. 8A–8E show the spherical aberration, astigmatism, distortion, lateral color, and coma, respectively, of the zoom lens of Embodiment 2 at the wide-angle end. FIGS. 9A–9E show the spherical aberration, astigmatism, distortion, lateral color, and coma, respectively, of the zoom lens of Embodiment 2 at an intermediate focal length setting; and FIGS. 10A–10E show the spherical aberration, astigmatism, distortion, lateral color, and coma, respectively, of the zoom lens of Embodiment 2 at the telephoto end. In FIGS. 8A, 9A, and 10A, the spherical aberration (in mm) is shown for the wavelengths 587.6 nm (the d-line), 435.8 nm (the g-line), and 656.3 nm (the C-line), and the f-number is shown. In the remaining figures, ω is the half-field angle. In FIGS. 8B, 9B, and 10B, the astigmatism (in mm) is shown for the sagittal image surface S and the tangential image surface T and is measured at 587.6 nm (the d-line). In FIGS. 8C, 9C, and 10C, distortion (in per cent) is measured at 587.6 nm (the d-line). In FIGS. 8D, 9D, and 10D, the lateral color (in mm) is shown for the wavelengths 435.8 nm (the g-line) and 656.3 nm (the C-line) relative to 587.6 nm (the d-line). In FIGS. 8E, 9E, and 10E, coma (in mm) is measured at 587.6 nm (the d-line).

As can be understood from the descriptions and tables considered with the above described figures, the zoom lenses of Embodiments 1 and 2 of the present invention realize a large zoom ratio with a compact structure while achieving high aberration correction, making them highly suitable as imaging zoom lenses in surveillance video cameras.

The present invention is not limited to the aforementioned embodiments, as it will be obvious that various alternative implementations are possible. For instance, values such as the radius of curvature R of each of the lens components and lens elements, the surface spacings D, the refractive index N, as well as the Abbe number ν, are not limited to the examples indicated in each of the aforementioned embodiments, as other values can be adopted. Such variations are not to be regarded as a departure from the spirit and scope of the present invention. Rather, the scope of the present invention shall be defined as set forth in the following claims and their legal equivalents. All such modifications as would be obvious to one skilled in the art are intended to be included within the scope of the following claims.

What is claimed is:

1. A zoom lens comprising four lens groups arranged along an optical axis in order from an object side as follows:
   a first lens group having positive refractive power;
   a second lens group having negative refractive power;
   a third lens group having positive refractive power; and
   a fourth lens group having negative refractive power;
   wherein
   the second and third lens groups move along the optical axis during zooming and the distance between the second and third lens groups changes during zooming; and the following conditions are satisfied:

$$0.24 < f1/ft < 0.29$$

$$-0.55 < f2/f3 < -0.44$$

where
   f1 is the focal length of the first lens group;
   ft is the focal length of the entire zoom lens at the telephoto end;
   f2 is the focal length of the second lens group; and
   f3 is the focal length of the third lens group.

2. The zoom lens of claim 1, wherein the first lens group includes, in order from the object side, a lens element having negative refractive power and two lens elements having positive refractive power, and the following conditions are satisfied:

$$N1 < 1.52$$

$$80 < \nu 1$$

where
   N1 is the arithmetic average of the indexes of refraction of said two lens elements; and
   ν1 is the arithmetic average of the Abbe numbers of said two lens elements.

3. The zoom lens of claim 2, wherein:
   the second lens group includes, in order from the object side, a lens element having negative refractive power and a lens component formed of a lens element having positive refractive power cemented to a lens element having negative refractive power; and
   the third lens group includes, in order from the object side, a lens element having positive refractive power and a lens component formed of a lens element having negative refractive power cemented to a lens element having positive refractive power.

4. The zoom lens of claim 3, wherein the zoom lens is formed of only four lens groups.

5. The zoom lens of claim 3, wherein each of the first lens group, the second lens group, and the third lens group consists of three lens elements.

6. The zoom lens of claim 5, wherein each of the first lens group, the second lens group, and the third lens group consists of two lens components.

7. The zoom lens of claim 2, wherein the zoom lens is formed of only four lens groups.

8. The zoom lens of claim 7, wherein each of the first lens group, the second lens group, and the third lens group consists of three lens elements.

9. The zoom lens of claim 8, wherein each of the first lens group, the second lens group, and the third lens group consists of two lens components.

10. The zoom lens of claim 2, wherein each of the first lens group, the second lens group, and the third lens group consists of three lens elements.

11. The zoom lens of claim 10, wherein each of the first lens group, the second lens group, and the third lens group consists of two lens components.

12. The zoom lens of claim 1, wherein:
   the second lens group includes, in order from the object side, a lens element having negative refractive power and a lens component formed of a lens element having positive refractive power cemented to a lens element having negative refractive power; and the third lens group includes, in order from the object side, a lens element having positive refractive power and a lens component formed of a lens element having negative refractive power cemented to a lens element having positive refractive power.

13. The zoom lens of claim 12, wherein the zoom lens is formed of only four lens groups.

14. The zoom lens of claim 12, wherein each of the first lens group, the second lens group, and the third lens group consists of three lens elements.

15. The zoom lens of claim 14, wherein each of the first lens group, the second lens group, and the third lens group consists of two lens components.

16. The zoom lens of claim 1, wherein the zoom lens is formed of only four lens groups.

17. The zoom lens of claim 16, wherein each of the first lens group, the second lens group, and the third lens group consists of three lens elements.

18. The zoom lens of claim 17, wherein each of the first lens group, the second lens group, and the third lens group consists of two lens components.

19. The zoom lens of claim 1, wherein each of the first lens group, the second lens group, and the third lens group consists of three lens elements.

20. The zoom lens of claim 19, wherein each of the first lens group, the second lens group, and the third lens group consists of two lens components.

* * * * *